United States Patent
Hernandez et al.

(10) Patent No.: US 9,751,119 B2
(45) Date of Patent: Sep. 5, 2017

(54) COMPOSITION, METHOD AND APPARATUS FOR SOIL REMEDIATION

(71) Applicants: Jose Rafael Hernandez, Ponce, PR (US); Antonio Ruben Camacho, Ponce, PR (US)

(72) Inventors: Jose Rafael Hernandez, Ponce, PR (US); Antonio Ruben Camacho, Ponce, PR (US)

( * ) Notice: Subject to any disclaimer, the term of this patent is extended or adjusted under 35 U.S.C. 154(b) by 0 days.

(21) Appl. No.: 14/196,891

(22) Filed: Mar. 4, 2014

(65) Prior Publication Data
US 2015/0251232 A1   Sep. 10, 2015

Related U.S. Application Data

(60) Provisional application No. 61/772,268, filed on Mar. 4, 2013.

(51) Int. Cl.
*B09C 1/08* (2006.01)
*B09C 1/02* (2006.01)

(52) U.S. Cl.
CPC .............. *B09C 1/08* (2013.01); *B09C 1/02* (2013.01); *B09C 1/025* (2013.01)

(58) Field of Classification Search
CPC .............. B09C 1/02; B09C 1/025; B09C 1/08
USPC ......................................... 405/128.7, 128.75
See application file for complete search history.

(56) References Cited

U.S. PATENT DOCUMENTS

| | | | | |
|---|---|---|---|---|
| 5,304,704 A | * | 4/1994 | Kammeraad | B09C 1/00 210/749 |
| 5,421,897 A | * | 6/1995 | Grawe | B08B 7/0014 134/6 |
| 5,454,878 A | | 10/1995 | Bala | |
| 5,634,983 A | * | 6/1997 | Kammeraad | B09C 1/00 134/25.1 |
| 5,637,154 A | | 6/1997 | Shorthouse | |
| 5,728,672 A | | 3/1998 | Richter | |
| 5,829,691 A | * | 11/1998 | Gaudin | B09C 1/02 241/46.01 |
| 2011/0091283 A1 | * | 4/2011 | Suib | B09C 1/08 405/128.75 |

* cited by examiner

*Primary Examiner* — Tara M. Pinnock
(74) *Attorney, Agent, or Firm* — Walter O. Alomar-Jimenez

(57) ABSTRACT

The disclosure describes a composition, process and apparatus for soil remediation on site using an encapsulating agent to separate contaminants from soil. The contaminated soil is saturated with the encapsulating agent, creating an immediate reaction causing the contaminants to dissociate from the soil in favor of association with the encapsulating agent. The encapsulating agent attracts and associates with the contaminants but do not dissolve them, resulting in a clearly-defined heterogeneous mixture with at least three phases, wherein said phases include contaminants at the top of the mixture, encapsulation agent at the middle and cleansed soil at the bottom of the mixture.

10 Claims, 4 Drawing Sheets

COMPOSITION, METHOD AND APPARATUS FOR SOIL REMEDIATION

RELATED APPLICATIONS

Provisional application No. 61/772,268, filed on Mar. 4, 2013.

STATEMENT REGARDING FEDERALLY SPONSORED RESEARCH AND DEVELOPMENT

N/A

BACKGROUND OF THE DISCLOSURE

Field of the Disclosure

The present invention relates to a composition, method and apparatus for removing soil contaminants, and more particularly for the removal of soil contaminants by saturating the contaminated soil with a recyclable, non-toxic encapsulation agent that separates oil and other contaminants from the soil.

Discussion of the Background

Soil contamination has become a major problem because of the large amounts of man-made pollutants and chemicals that have been put into the environment. These contaminants affect the environment and endanger people's health. People's health can be damaged by various ways; for example, by touching the soil, or by breathing the air in the area where the soil is. In addition to the foregoing, the people's health may be endangered due to ground water contamination as a direct result of the soil contaminants. Federal and state laws have been enacted to mandate the clean-up of both intentional and unintentional contaminated sites.

The most common causes of soil contamination are oil, diesel, gasoline, petroleum-based products or other hydrocarbons exposed over a surface, including soil and sand, or a body of water due to oil spills and others. Major sources of these contaminants are refineries, gas stations, chemical plants and oil industries.

Currently, several apparatus and methods are used to clean-up contaminated soil. Alcohol, petroleum-based solvents or water are among the methods used to dissolve the contaminants from the soil and then return the cleansed soil to the original site. However, these processes have a number of disadvantages. For instance, the solvent used in those processes dissolves the contaminants from the soil resulting in a homogeneous mixture of solvent/contaminant. In these cases, it requires different or several post-treatment processes, such as distillation, to separate the solvent/contaminant mixture in order to re-use the solvent in the soil remediation process as well as to properly dispose the contaminant pursuant to federal and state law. These post-treatment processes are expensive and time consuming.

Furthermore, in most processes large amounts of solvent is needed to completely clean the soil thus making the process expensive and ineffective. Also some of the solvents used in the art are toxic thus requiring post-treatment of the soil before returning it to the original site.

Therefore, there is a need for a composition, method and apparatus for treatment contaminated soil on site which uses a non-toxic encapsulating agent that can effectively separate or remove contaminants from soil but also that can be amenable to an easy separation from the contaminant. In light of this, the contaminants may be disposed pursuant to federal and state law, and the non-toxic encapsulating agent may be recycled back in the remediation process.

Thus, in view of the above-mentioned deficiencies in the art, an object of the present invention is to provide an encapsulating agent to be used in soil remediation which is non-toxic, non-flammable and non-harmful to flora or fauna and containing no carcinogens.

It is another object of the present disclosure to provide a water-soluble and biodegradable encapsulating agent.

It is another object of this disclosure to provide a continuous, closed-loop system, which recycles the encapsulating agent in the soil remediation process.

It is another object of the present disclosure to provide a method and composition simple and cost-efficient for removing soil contaminants.

Further another object of the present disclosure is to provide an apparatus for using a recyclable encapsulating agent that separates efficiently contaminants from soil at the original contaminated site.

Furthermore, the encapsulation agent of the present disclosure is effective for acting as a cleaning solvent for petroleum products, such as oil spill cleanups or removal of tar and grease waste.

SUMMARY

In accordance with the principles of the present invention, a soil remediation composition, method and apparatus are provided. Soil remediation is preferably made at the original contaminated site with a portable remediation apparatus. Contaminated soil is excavated and cleansed in the remediation apparatus with a non-toxic, biodegradable encapsulating agent and then the cleansed soil is returned to the original site free from contaminants. Residues of the encapsulating agent in the cleansed soil are susceptible to biodegradation and would not harm the environment or the flora at the original site.

The encapsulating agent of the present disclosure comprises an anionic surfactant, an alcohol, a non-ionic surfactant, pine oil and water. In accordance with the principles of the present disclosure, the encapsulating agent is mixed with the contaminated soil with a sufficient amount to saturate the contaminated soil. The encapsulating agent creates an immediate reaction causing the contaminants to dissociate from the soil in favor of association with the encapsulating agent. The admixture of contaminated soil and encapsulating agent is agitated for a period of time sufficient to permit complete contact between the encapsulating agent and the contaminated soil to promote full disassociation of the contaminants from the soil in favor of association with the encapsulating agent. The encapsulating agent attracts and associates with the contaminants but does not dissolve them, resulting in a clearly-defined heterogeneous mixture with at least three phases, wherein said phases include contaminants at the top of the mixture, encapsulation agent at the middle of the mixture and cleansed soil at the bottom of the mixture.

The cleansed soil is free from contaminant or contains residues of contaminants at levels permitted by federal and state law and thus can be returned to the original site. The contaminants such as oil, diesel, gasoline or other hydrocarbons are easily separated from the heterogeneous mixture comprising encapsulating agent/contaminants by a skimming process. The encapsulating agent is then recycled back into the soil remediation process of the present disclosure.

BRIEF DESCRIPTION OF THE DRAWINGS

The accompanying drawings, which are incorporated herein, constitute part of the specification and illustrate the preferred embodiment of the disclosure.

DESCRIPTION OF THE PREFERRED EMBODIMENT

Figure 1:
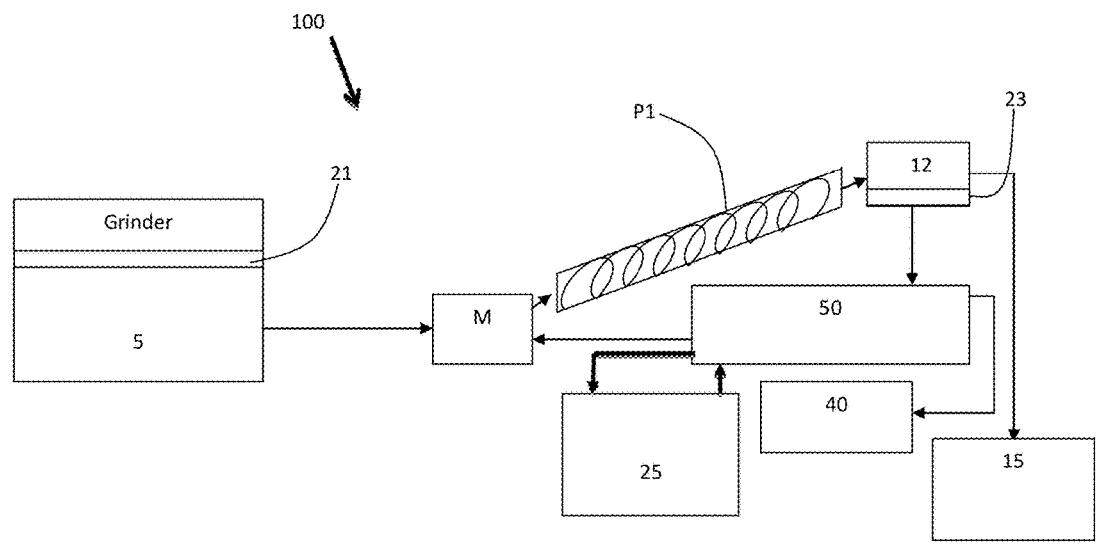
FIG. 1 shows a general structure of the present disclosure in accordance with the principles of the present disclosure.

The encapsulating agent of the present disclosure comprises an anionic surfactant, an alcohol, a non-ionic surfactant, pine oil and water.

Anionic Surfactant

Anionic surfactants suitable to be used in the present invention include: sodium lauryl sulfate, alkali metal salts, ammonium salts, alkyl sulfates, alkyl ether sulfates, and generally the alkyl or acyl radical in these various compounds comprise a carbon chain containing 12 to 20 carbon atoms. In the preferred embodiment the anionic surfactant is sodium lauryl sulfate, preferably the composition commercially available under the tradename Lessrex 70®.

The anionic surfactant may be present in the compositions in amounts of up to about 6% by weight, but most preferably in amount of between from 0.8% to 3%.

Alcohol

Exemplary alcohols to be used in the present invention to enhance the miscibility of the pine oil in water include: lower alkyl alcohols, especially $C_1$-$C_8$ alcohols, preferably isopropyl alcohol, propanol and ethanol. In the preferred embodiment the alcohol is isopropyl alcohol.

The alcohol may be present in the compositions in amounts of up to about 6% by weight, but most preferably in amount of between from 0.8% to 3%.

Nonionic Surfactants

Nonionic surfactants suitable for the present invention include condensation products of one or more alkylene oxide groups with an organic hydrophobic compound, such as an aliphatic or alkyl aromatic compound. Suitable nonionic surfactants include alkoxylated alcohols which include ethoxylated alcohols.

Exemplary alkoxylated alcohols include certain ethoxylated alcohol compositions commercially available include Neodol® from Sheel Company, which is described as a linear alcohol ethoxylate, Tergitol® from Union Carbide Co. (Danbury, Conn.), which is described as a secondary alcohol ethoxylate, and Imbirex CR® from American Chemical, which is described primary as an alcohol ethoxylated. In the preferred embodiment the nonionic surfactant is an ethoxylated alcohol, preferably the composition commercially available under the tradename Imbirex CR®.

The nonionic surfactant may be present in the compositions in amounts of up to about 3% by weight, but most preferably in amount of between from 0.4% to 1.5%.

Pine Oil

Pine oil is a complex blend of oils, alcohols, acids, esters, aldehydes, and other organic compounds. These include terpenes which include a larger number of related alcohols or ketones. Preferred terpenes are mono- and bicyclic monoterpenes, especially those of the hydrocarbon class, which can be selected from terpinenes, terpinolenes, limonenes and pinenes. Highly preferred materials of this type include d-limonene, dipentene, α-pinene, β-pinene and the mixture of terpene hydrocarbons obtained from the essence of oranges.

Particularly effective pine oils which are presently commercially available include Unipine 60 (from Union Camp, which is believed to contain approximately 60% terpene alcohols), Unipine® S-70 and Unipine® S-70 (from Union Camp, both are believed to contain approximately 70% terpene alcohols), and any other pine oil up to 100% terpene alcohol. Other examples of commercially available pine oils can be found in U.S. Pat. No. 5,728,672.

The pine oil may be present in the compositions in amounts of up to about 6% by weight, but most preferably in amount of between from 0.8% to 3%.

Water

Deionized water, tap water or sea water may be used in the present invention. Surprisingly, using sea water (water with concentration of salts of about 1%-5%) provides with a better encapsulating agent for removing soil contaminants. Because sea water may be used in the present invention, it lowers the cost in obtaining or using deionized water.

Water may be present in the compositions in amounts of up to about 97% by weight, but most preferably in amount of between from 90% to 95%.

In one embodiment of this disclosure, the anionic surfactant is mixed with the alcohol in equal parts and stirred until a homogeneous phase is achieved and it shows luminous halos. The resulted mixture is blended with the non-ionic surfactant and stirred until a homogeneous phase is achieved. The resulted mixture is further blended with the pine oil and stirred until a homogeneous phase is achieved. The resulted mixture is further blended with water and stirred until a homogeneous phase is achieved. Then, the mixture is allowed to rest. The resulting mixture is the encapsulating agent 30.

In accordance with the principles of the present invention, a soil remediation process is performed on-site of the contaminated area, allowing in the case of contaminated sand to be cleansed and returned to the beach restoring the site. Therefore, the apparatus is preferably portable.

The term soil includes: soil, sand, and other solid surfaces such as petroleum tanks. Also it includes water, and other liquid surfaces which have been contaminated with contaminants. The term contaminants include, but is not limited to, oil, gasoline, diesel, petroleum-based products and other hydrocarbons.

Referring now to the drawings, FIGS. 1-5 shows a soil remediation process and apparatus embodying the principles of the present invention, which is designated generally by the reference number 100.

The soil remediation process starts with the collection of the contaminated soil on site. A loader or bobcat is used to excavate from the ground the contaminated soil and is delivered to the portable, soil remediation apparatus 100 via a hopper 5. In one embodiment of the present disclosure, the hopper 5 contains at its entrance a size-limiting screen 21.

Contaminants may act as binders that can agglutinate the soil with other materials such as stones, rocks, the same soil, and other materials. In this instance, the particle size of the soil will be larger than the median particle size of the soil at that site. Agglomeration, also, may prevent the encapsulating agent 30 to fully remove the contaminants from soil.

In light of the foregoing, it is preferred that a study of the characteristics of the soil is performed to determine the median particle size of the soil. The size of the limiting screen 21 will be equal or similar to the median particle size. In this case, the size-limiting screen 21 will prevent the passage of large, agglutinated particles to the soil remediation process 100. Instead, those agglutinated particles are deposited into a grinder, as shown in FIG. 1, that mechanically breaks the agglutinated soil into a particle size equal or similar to the median particle size. The purpose of this is to avoid any damages or changes in the characteristics of the soil in the remediation process, allowing the site to retain its characteristics when the soil is returned. Also breaking the agglutinated soil into smaller particles increases the surface area that will be in contact with the encapsulating agent 30, thus facilitating the removing of contaminants.

The contaminated soil is transported from the hopper 5 by means of a conveyer belt or any other transporting means and deposited into a mixer M.

Figure 2:
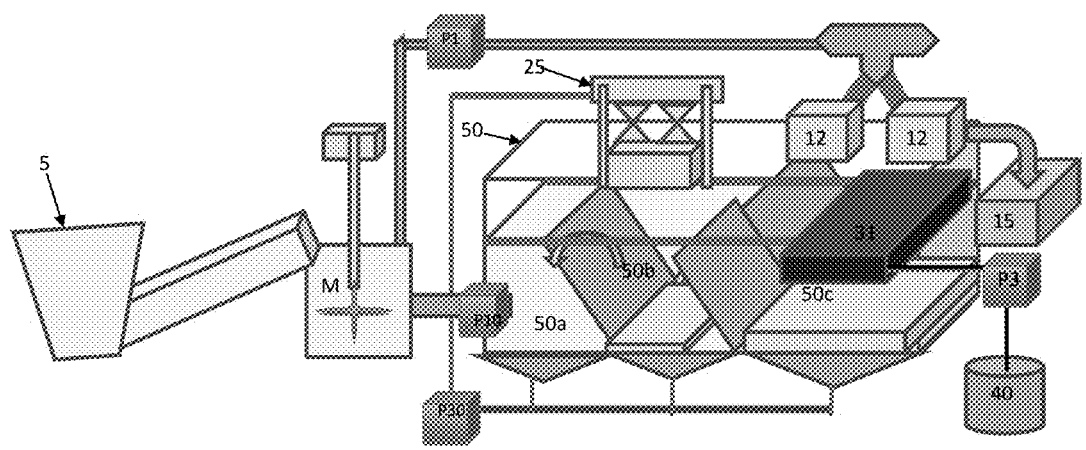
FIG. 2 shows a more detailed embodiment of the method and apparatus for remediation of soil of the present disclosure in accordance with the principles of the present invention.

An encapsulating agent tank 50, as shown in FIG. 2, contains at least three chambers: a first chamber 50a, a second chamber 50b and a third chamber 50c. The encapsulating agent tank 50 is partially filled with the encapsulating agent 30 before any contaminated soil is introduced into the soil remediating apparatus 100.

The encapsulating agent 30 is transferred from the first chamber 50a of the encapsulating agent tank 50 to the mixer M with a pump P10, as shown in FIG. 2. The contaminated soil is stirred, mixed and blended with the encapsulating agent 30 in the mixer M by means of blades, mixers, stirrers, electric motor or any other agitation unit capable of mixing the contaminated soil with the encapsulating agent 30.

The contaminated soil is saturated with the encapsulating agent 30 in the mixer M. Preferably the ratio of encapsulating agent 30 to contaminated soil is at least 3:1. Once the contaminated soil is saturated with the encapsulating agent 30 for a period of time sufficient to allow complete interaction between them, the encapsulating agent 30 creates an immediate reaction causing the contaminants 31 to dissociate from the soil in favor of association with the encapsulating agent 30. The admixture 3 comprising contaminated soil and encapsulating agent 30 is transported upward from the mixer M to at least one soil shaker 12 by means of an impeller pump P1 or any other transporting means, capable of moving both the solid (soil) and the liquids (contaminants 31 and encapsulating agent 30), as shown in FIG. 1. At this point, the encapsulating agent has attracted most of the contaminants 31, resulting in a heterogeneous mixture of mainly two phases. The first phase is substantially a solid phase comprising cleansed soil, which contains larger particles, and the second phase is substantially a liquid phase comprising the contaminants 31 and the encapsulating agent 30, which contain smaller particles.

Figure 3:
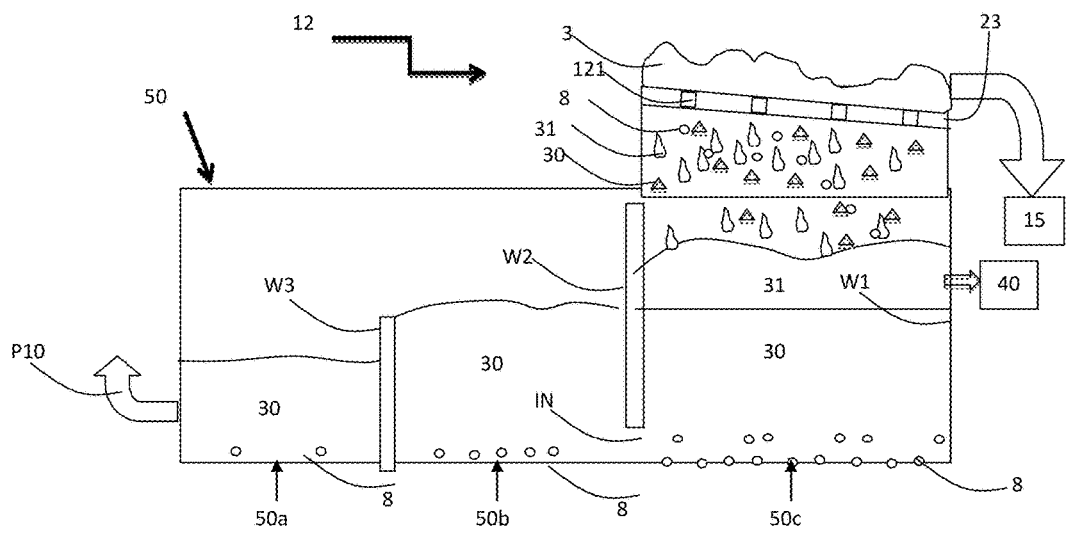
FIG. 3 shows an exemplary embodiment of the method and apparatus for remediation of soil between the shaker and the encapsulating agent tank in accordance with the principles of the present disclosure.

As shown in FIG. 3, the shaker 12 comprises a screen 23 having a particular mesh size. Usually shaker 12 is shaken with reciprocating linear movement along a horizontal axis. The movement is designed to cause material resting on the screen 23 to slide forward slightly with each cycle of motion, and perhaps falling through one of the holes 121 if the particle is small enough. Due to the fact that the cleansed soil contains large particles, said cleansed soil does not fall through the screen 23, and the cleansed soil is eventually ejected off of the forward end of the screen 23 into a recovery soil tank 15 for immediate return to the site.

The cleansed soil may contain traces of contaminants 31 but are at levels permitted by federal and state environmental regulations. Furthermore, the cleansed soil may contain traces of the encapsulating agent 30. However, the cleansed soil may be returned to the original site safely since the encapsulating agent 30 is non-toxic and biodegradable.

Soil shaker 12 is preferably positioned directly over the third chamber 50c of the encapsulating agent tank 50, as shown in FIG. 3. The liquid phase passes through the shaker screen 23 and falls into the third chamber 12c. Also small particles of soil 8 pass through the shaker screen 23 and falls into the third chamber 50c.

In the third chamber 50c of the encapsulating agent tank 50, the process for the separation of the components of the liquid phase starts. FIG. 3 explains the separation process more in details. Mainly the liquid phase is allowed to rest inside the third chamber 50c. Due to their differences in densities each component of the liquid phase starts to separate from each other providing two layers. The contaminants 31, being less dense than the encapsulating agent 30, will tend to float to the top of the liquid phase. The encapsulating agent 30 will tend to rest at the bottom of the liquid phase. The smaller particles of soil 8 will tend to settle at the bottom of the third chamber 50c.

Figure 4:
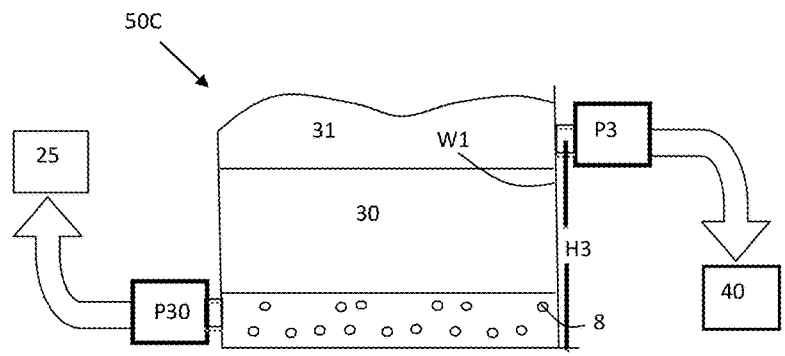
FIG. 4 shows an exemplary embodiment of the method and apparatus for the third chamber of the encapsulating agent tank in accordance with the principles of the present disclosure.
Figure 5:
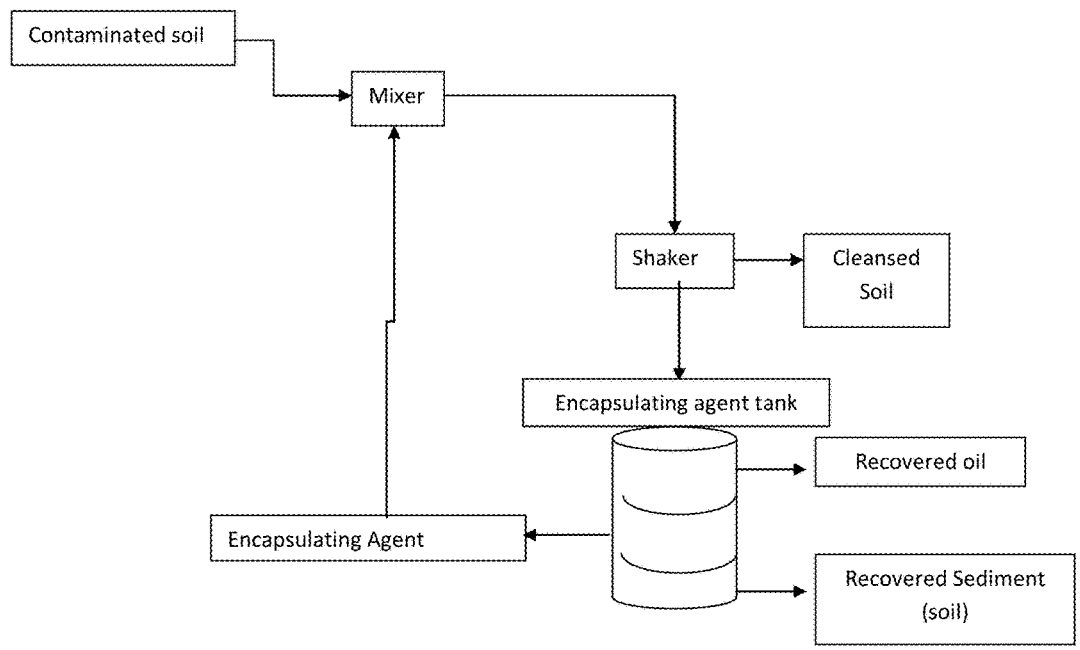
FIG. 5 shows a flow chart of the exemplary process for treating contaminated soil in accordance with the principles of the present disclosure.
Figure 6:
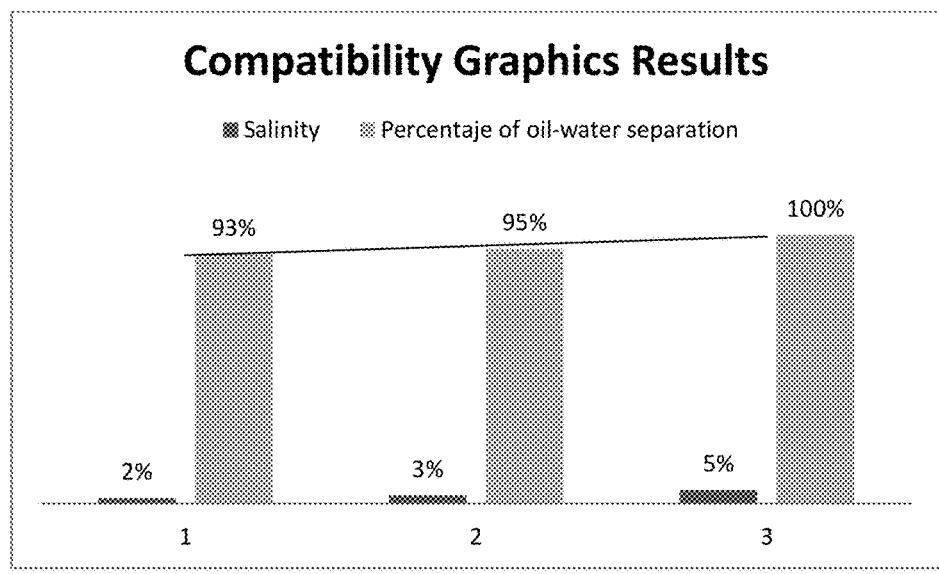
FIG. 6 shows the effectiveness of the encapsulating agent when saline water (water with salt) is used. Due to the fact that the encapsulating agent may use sea water as the water component, it lowers the costs in obtaining or using deionized water.

The contaminants 31 at the top of the liquid phase are removed with a pump P3 into a contaminant recovery tank 40. The pump P3 is preferably positioned at a predetermined height H3 of a first wall W1 of the third chamber 50c, as shown in FIG. 4. The height H3 is adjusted in conjunction with the flow rate of the contaminated soil entering the apparatus 100 and the pump P10 to cause a predetermined depth of fluid to be continuously removed from the top of the liquid phase of the third chamber 50c into the recovery contaminant tank 40.

The recovered contaminant 31 in the recovery contaminant tank 40 is essentially free from the encapsulating agent 30 and the smaller soil particles 8. In the case that the contaminant 31 is oil, the recovered oil may be used as heating oil or any other oil fuel application.

The third chamber 50c also contains a second wall W2, which is opposite to the first wall W1, as shown in FIG. 3. The encapsulating agent 30 in chamber 50c flows to the second chamber 50b by means of an inlet IN located at the bottom of the second wall W2. The inlet IN is positioned at a predetermined depth of the second wall W2 in order to prevent that any contaminant 31 that is floating at the top of the liquid phase in chamber 50C passes to chamber 50b. The liquid phase that flows from chamber 50c to the second chamber 50b comprises only the encapsulating agent 30 and some smaller particles of soil 8, which will tend to settle at the bottom of the second chamber 50b.

The second chamber 50b contains a first skimming wall W3, which is opposite to the second wall W2, as shown in FIG. 3. The encapsulating agent 30 in the chamber 50b flows over the first skimming wall W3 to the first chamber 50a. Most of the smaller soil particles 8 are retained at the bottom of chamber 50b. Only a minimum amount of smaller particles of soil 8 passes with the encapsulating agent 30 by overflow to chamber 50a.

Small particles of soil 8 in chambers 50a, 50b and 50c have a particle size smaller than 35-40 microns. Particles of this size become very difficult to separate with soil shakers. In order to remove the smaller soil particles 8 from the encapsulating agent 30 in each of the chambers 50a, 50b and 50c, it is preferred to pass the fluid containing said small particles of soil 8 through a desilter unit 25, which are known in the industry as "hydrocyclones", as shown in FIG. 2 and FIG. 4.

The desilter unit 25 is preferably positioned directly over the second chamber 50b, as shown FIG. 2. The desilter unit 25 separates the small particles of soil 8 from the encapsulating agent 30. Each chamber 50a, 50b, and 50c contains a pump P30 at its bottom that transfers the fluid containing encapsulating agent 30 and small particles of soil 8 to the desilter unit 25, as shown in FIG. 3.

The small particles of soil 8 recovered from the desilter unit 25 are forward to the recovery soil tank 15. The encapsulating agent 30, which is not retained in the desilter unit 25, falls into the second chamber 50b essentially free from smaller soil particles 8.

Through the actions of the separation process through difference in densities of the encapsulating agent 30 and the contaminants 31 in chamber 50c, in combination to the progressive skimming in the encapsulating agent tank 50, with the soil shaker 18 and the desilter unit 25, the encapsulating agent 30 of the first chamber 50a is substantially free from contaminants 31 and smaller soil particles 8 and, therefore, is available to be recycled back to the remediation process of the present disclosure.

The recirculation of the encapsulating agent 30 in the closed-loop remediation process, over time, will cause the concentration of the encapsulating agent 30 to decrease. In this case, new amounts of encapsulating agent 30 must be introduced into the system. The monitoring of the concentration of the encapsulating agent 30 may be done by manual sampling, visual inspection or with an optical detection system (not shown) that automatically monitors the light transmissivity of the encapsulating agent 30, as is known.

EXAMPLES

Table 1. shows the results of several tests performed to evaluate the effectiveness of the encapsulating agent in removing oil and other contaminants from sand. Different amounts of oil and other contaminants were added to a sand sample in the several tests. The encapsulating agent comprises: 1.43% of Lessrex 70®(sodium lauryl sulfate), 1.43% of isopropyl alcohol, 0.71% of Imbirex Cr®(ethoxylated alcohol), 1.43% of pine oil and 95% of water. After saturating the contaminated sand with the encapsulating agent, as can be observed from the results in Table 1, in all trials the TPH in the samples were low with over 90% of oil recovery.

| Concentration 5% Active Ingredient of Encapsulating Agent ||||||
|---|---|---|---|---|---|
| Initial percentage of oil in samples | Oil Volume (ML) | Percentage of Oil and grease | TPH or Total Petroleum Hydrcarbon | Recovered Volume (MI) | Percentage of Recovery |
| 5% | 6.5 | .30% | 0.14 | 6.1 | 93.84% |
| 10% | 12.5 | .34% | 0.16 | 12.1 | 96.80% |
| 15% | 19.5 | .68% | 0.32 | 18.6 | 95.38% |
| 20% | 27.5 | .72% | 0.36 | 26.5 | 96.36% |

What is claimed is:

1. A method for treatment of contaminated soil comprising:
   a site with contaminated soil;
   an encapsulating agent;
   an encapsulating agent tank at least a first chamber and a second chamber,
   wherein said encapsulating agent tank is filled with said encapsulating agent; and
   a soil remediation process, wherein said remediation process comprises the steps of:
   a) removing contaminated soil from site;
   b) mixing said contaminated soil with said encapsulating agent to create an admixture, wherein said admixture comprises at least a first phase and a second phase, wherein said first phase comprises at least cleansed soil, and said second phase comprises at least one contaminant and the encapsulating agent;
   c) agitating the admixture;
   d) removing the first phase from said second phase;
   e) redirecting said second phase to the first chamber of the encapsulating agent tank;
   f) saturating said second phase with the encapsulating agent;
   g) removing from said second phase the contaminant;
   h) redirecting the encapsulating agent from the bottom of said first chamber to the second chamber through an inlet between the first chamber and the second chamber; and
   i) recycling back the encapsulating agent in the soil remediation process.

2. The method for treatment of contaminated soil as in claim 1, wherein the encapsulating agent comprises: i) an anionic surfactant, ii) an alcohol; iii) a non-ionic surfactant; iv) pine oil; and v) water.

3. The method for treatment of contaminated soil as in claim 1, wherein the encapsulating agent comprises: i) 0.8-6% wt. of an anionic surfactant, ii) 0.8-6% wt. of an alcohol; iii) 0.4-3% wt. of a non-ionic surfactant; iv) 0.8-6% wt. of pine oil; and v) 90-97% wt. of water.

4. The method for treatment of contaminated soil as in claim 1 wherein the encapsulating agent comprises: i) 0.8-6% wt. of sodium lauryl sulfate; ii) 0.8-6% wt. of isopropyl alcohol; iii) 0.4-3% wt. of ethoxylated alcohol; iv) 0.8-6% wt. of pine oil; and v) 90-97% wt. of water.

5. The method for treatment of contaminated soil as in claim 1, wherein the contaminated soil is mixed and saturated with the encapsulating agent in at least a 3:1 ratio.

6. The method for treatment of contaminated soil as in claim 1, wherein said encapsulating agent is water-soluble and biodegradable.

7. The method for treatment of contaminated soil as in claim 1, wherein the step of removing the first phase from the second phase comprises a shaker.

8. The method for treatment of contaminated soil as in claim 7, wherein said shaker comprises a screen having a mesh size, said mesh size is small enough to avoid the first phase to pass through said mesh.

9. The method for treatment of contaminated soil as in claim 1, wherein the second phase comprises at least a first density and a second density, wherein the first density is the contaminant and the second density is the encapsulating agent.

10. The method for treatment of contaminated soil as in claim 9, wherein the step for removing the contaminants from the second phase comprises at least a first pump.

* * * * *